US007431100B2

(12) United States Patent
Al-Osaimi

(10) Patent No.: US 7,431,100 B2
(45) Date of Patent: Oct. 7, 2008

(54) FIRE FIGHTING TOOL

(76) Inventor: Zafer J. Al-Osaimi, Block 3, Bldg 24, Floor 2, Apt. 11, Sabah Alsalem (KW)

( * ) Notice: Subject to any disclaimer, the term of this patent is extended or adjusted under 35 U.S.C. 154(b) by 39 days.

(21) Appl. No.: 11/468,881

(22) Filed: Aug. 31, 2006

(65) Prior Publication Data

US 2008/0053668 A1 Mar. 6, 2008

(51) Int. Cl.
*A62C 31/22* (2006.01)
*F16L 5/00* (2006.01)

(52) U.S. Cl. ............................ 169/70; 169/67; 169/51; 169/52; 169/47; 134/183; 137/356; 137/357

(58) Field of Classification Search .................. 169/54, 169/67, 68, 70, 51, 64; 118/305, 207; 239/525, 239/532; 137/343, 356, 357, 167 R, 175, 137/183, 198; 134/167 R, 175, 183, 198
See application file for complete search history.

(56) References Cited

U.S. PATENT DOCUMENTS 1,476,810 A * 12/1923 Gilsenan .................... 239/531
4,187,913 A * 2/1980 Wilcox ........................ 169/51
D264,010 S * 4/1982 Graf .......................... D29/129
4,359,063 A * 11/1982 Carlson .................. 134/167 R
4,781,252 A * 11/1988 Wilburn et al. ................ 169/68
5,351,891 A * 10/1994 Hansen et al. .............. 239/248
6,035,940 A * 3/2000 Bourke ........................ 169/47
7,114,575 B2 * 10/2006 De Anda-Uribe et al. ..... 169/24

* cited by examiner

*Primary Examiner*—Len Tran
*Assistant Examiner*—James S Hogan
(74) *Attorney, Agent, or Firm*—Lowe Hauptman Ham & Berner, LLP

(57) ABSTRACT

A fire fighting tool includes an elongated hollow cylindrical nozzle having a plurality of openings surrounding the nozzle, a tubular member and a coupling for connecting the tubular member to a hose. The tool also includes a mounting member for positioning the nozzle within an interior of a structure. The mounting member includes a base, an upper member and a pair of rotatable clamping members adjustably mounted on the mounting member for engaging inner and outer surfaces of a wall. The mounting member and nozzle extend through an opening in the wall for spraying water or other fire suppressant onto the fire. The tool also includes a rotatable heat shield for protecting a fireman from heat and smoke and a handle for carrying the tool.

8 Claims, 4 Drawing Sheets

FIG. 1
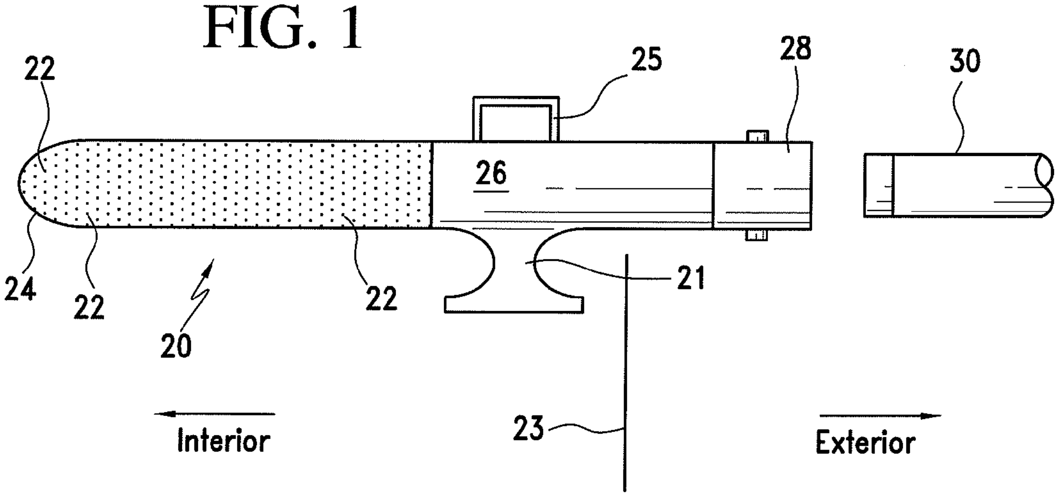
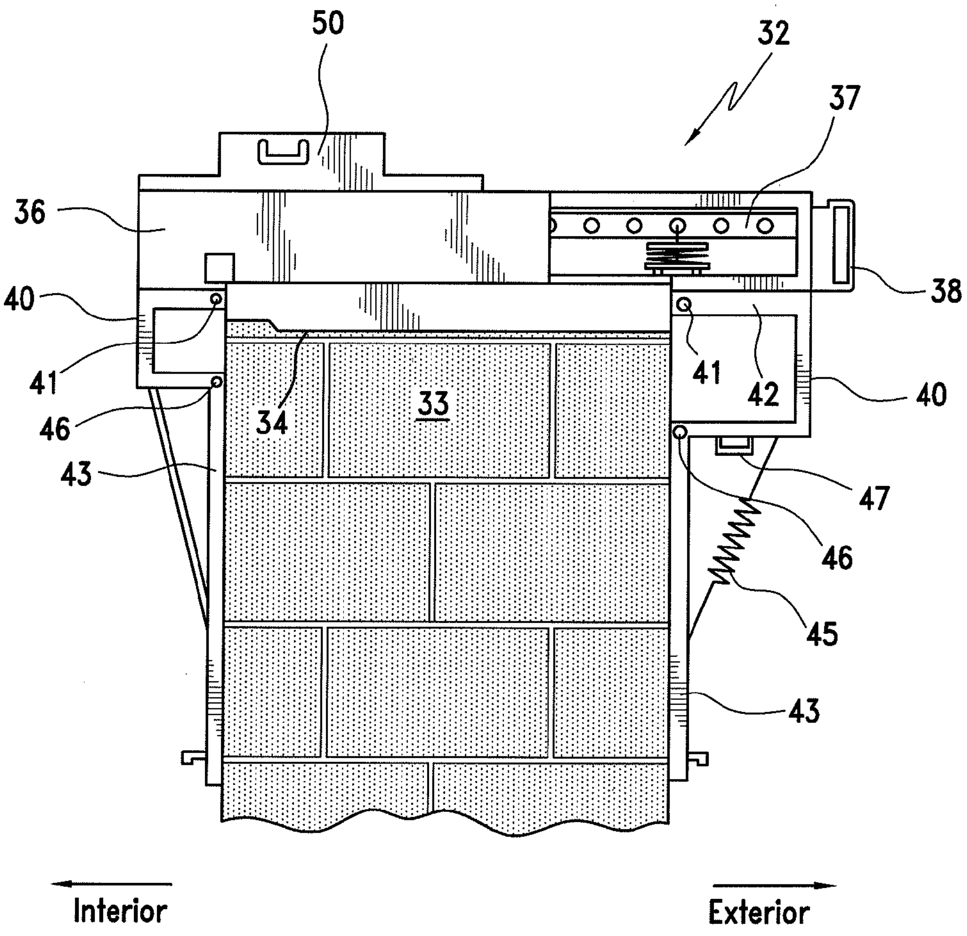
FIG. 2

FIG. 3
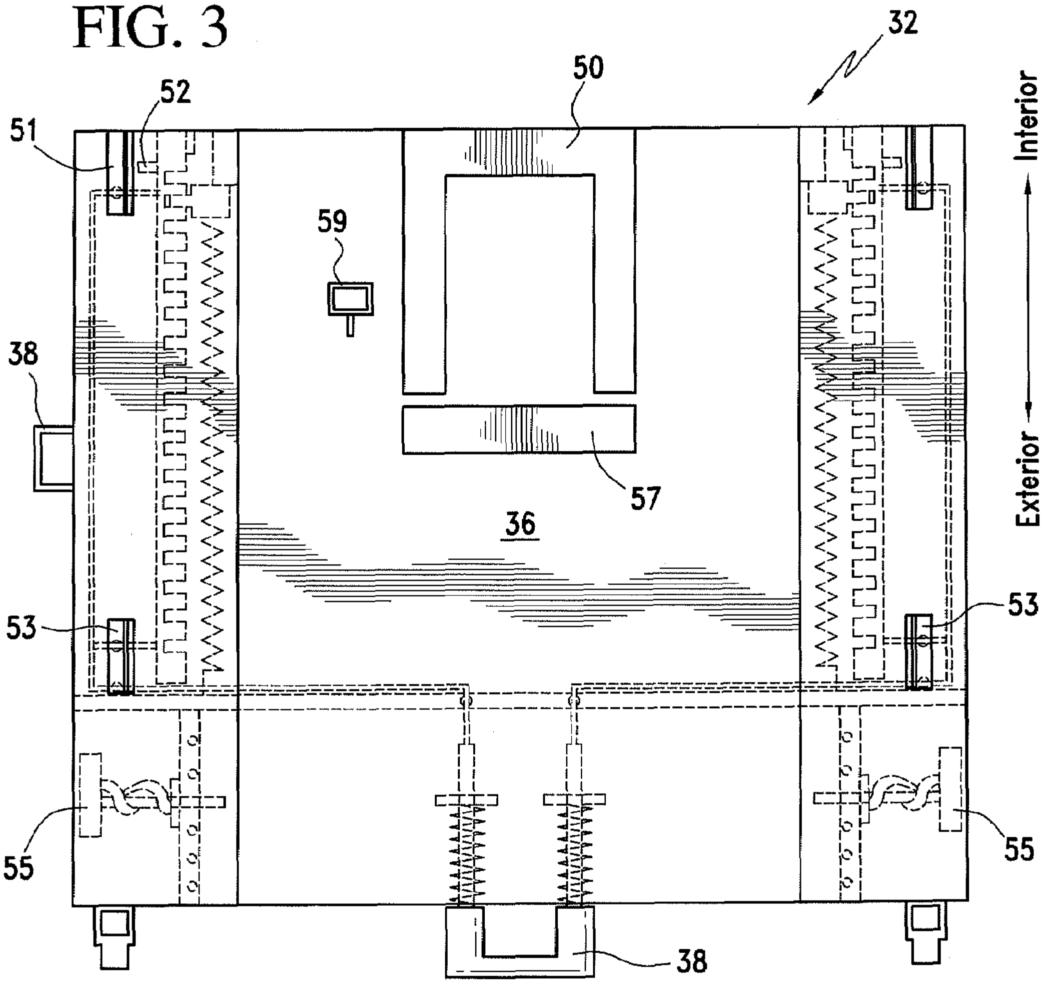
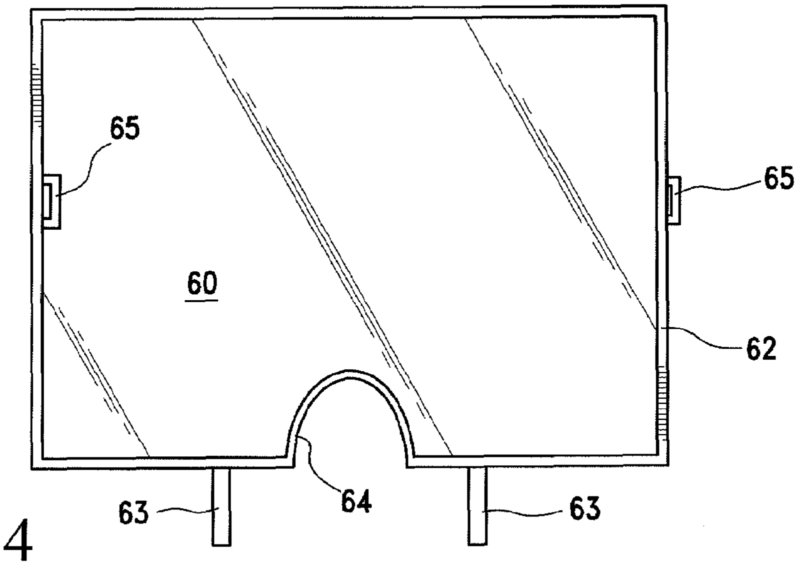
FIG. 4

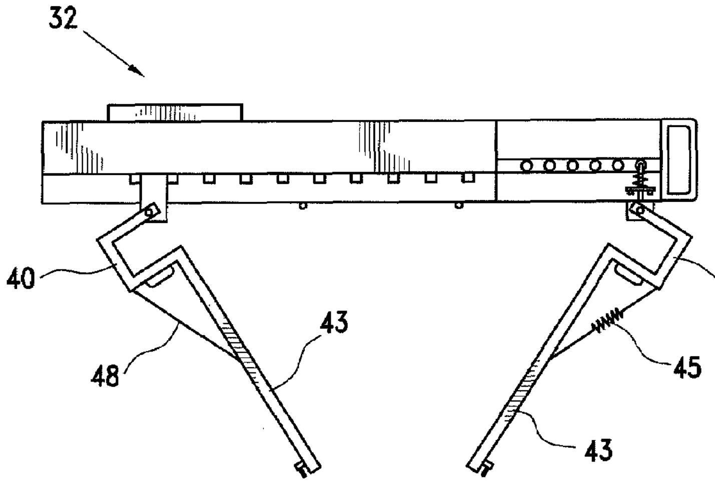
FIG. 6
FIG. 5
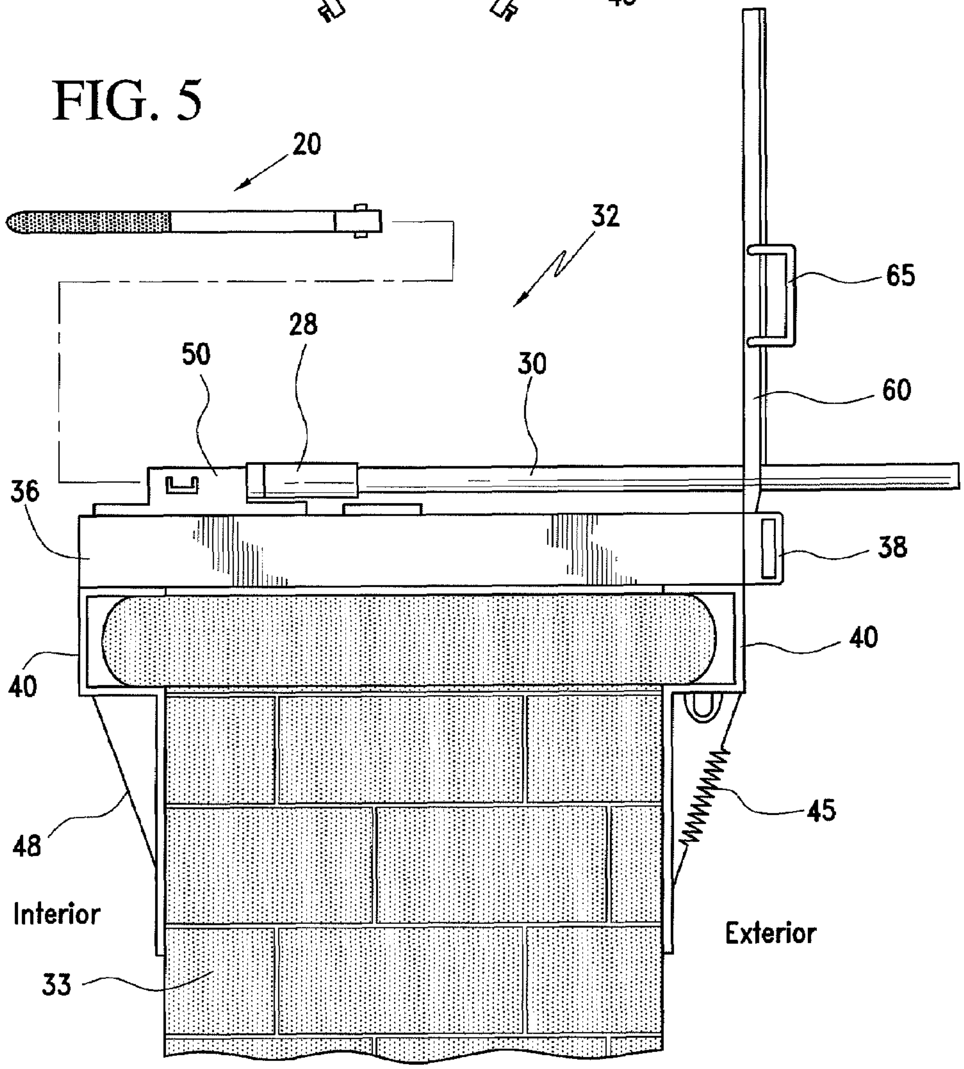

FIRE FIGHTING TOOL

FIELD OF THE INVENTION

This invention relates to a fire fighting tool and more particularly to a fire fighting tool that is mounted through an opening in a wall and adapted to spray water or other fire suppressant into an interior of a structure.

BACKGROUND FOR THE INVENTION

The conventional method of fighting and suppressing a fire in a building is with built-in sprinkler systems and/or fire department personnel. Usually fire fighting equipment and men are simply rushed to a building in response to a fire alarm. Upon arrival at a fire, the firemen frequently encounter flames and smoke that have advanced upwardly within a structure causing large volumes of heated air, smoke and flames to travel to an upper area of the building. Accordingly, it is often necessary to quench the upper areas with water or other fire suppressant. However, it is dangerous to employ a fireman on a ladder in close proximity to smoke and flames in order to direct water at strategic areas to extinguish the flames.

Various approaches have been taken to mount hoses in or through walls of buildings and for applying a fire suppressant to fire in upper areas of a structure. For example, a.U.S. Pat. No. 4,781,252 of Wilburn et al., discloses an apparatus for fighting fires within storage tanks. As disclosed, the apparatus includes a frame moveably coupled to the lip of a storage tank. The frame includes rotatable members by which the frame may be moved around the lip of the tank. Attached to the frame is a holding device adapted to hold a fire extinguisher nozzle on the interior of the storage tank to direct fire extinguishing agents down the inside face of the storage tank. The apparatus may include a fire detector to detect the presence and location of the fire, propulsion means to automatically move the apparatus around the storage tank to a location adjacent to the fire source and a storage tank for restoring fire suppressant agents to be used in extinguishing the fire.

Portable fire shields for protection of firemen are also known. For example a U.S. Pat. No. 3,193,017 of Walker discloses a portable fire shield and fire hose support which can be collapsed for storage and rapidly erected. The fire shield is especially useful with untrained personnel in extinguishing high temperature gas and oil fires as sometimes occur in factories, shops, garages and the like.

Notwithstanding the above, it is presently believed that there is a need and a potential market for an improved fire fighting tool in accordance with the present invention. There should be a need and a commercial market for such tools because they facilitate extinguishing fires in structures without the need to enter the structure. Further, such tools allow firemen to apply water from an upper story window or vent and after mounting the tool leave the immediate area. In addition, the tool includes a fire and heat shield for protecting a fireman during the installation of the tool. In addition to the above, the tools in accordance with the present invention are relatively light in weight, durable and easily installed through a window in the structure.

BRIEF SUMMARY OF THE INVENTION

In essence, the present invention contemplates a fire fighting tool for protecting a fireman from heat, flames and smoke when in close proximity to the fire. The tool includes an elongated hollow cylindrical nozzle having a plurality of openings around the nozzle and a tubular member connected to the nozzle at one end thereof. A coupling is provided at an opposite end of the tubular member for connecting the tubular member to a source of pressurized water so that water flows through the tubular member and out of the nozzle. A mounting member for positioning the nozzle within an interior of the structure inwardly of an interior wall of the structure includes a base and a pair of rotatable clamping members. The rotatable clamping members are adjustably mounted on a base and are linearly adjustable along the base so that the distance between the clamping members can be adjusted to accommodate walls of different thicknesses. The rotatable clamp members are each rotatable through approximately 90° between a generally parallel position with respect to the base to a perpendicular position wherein they are each parallel with one another and with a structure wall. A handle of conventional design for carrying the tool is also fixed to the base. In addition, the tool includes a rotatable heat shield mounted on the base and rotatable from a position that is parallel to the base to an upright position which is generally perpendicular to the base.

The invention will now be described in connection with the accompanying drawings wherein like reference numerals have been used to identify like parts.

DESCRIPTION OF THE DRAWINGS

FIG. 1 is a side elevational view of a nozzle, tubular member, coupling and hose as used in the present invention;

FIG. 2 is a side elevational view of a mounting member in accordance with the invention;

FIG. 3 is a top or plan view of the mounting member shown in FIG. 2;

FIG. 4 is front elevational view of a heat shield as used in the present invention;

FIG. 5 is a side elevational view of a fire fighting tool in accordance with the invention as installed on a wall of a structure;

FIG. 6 is a schematic illustration of a mounting member and rotatable clamping members;

DESCRIPTION OF THE PREFERRED EMBODIMENTS OF THE INVENTION

Figure 7:
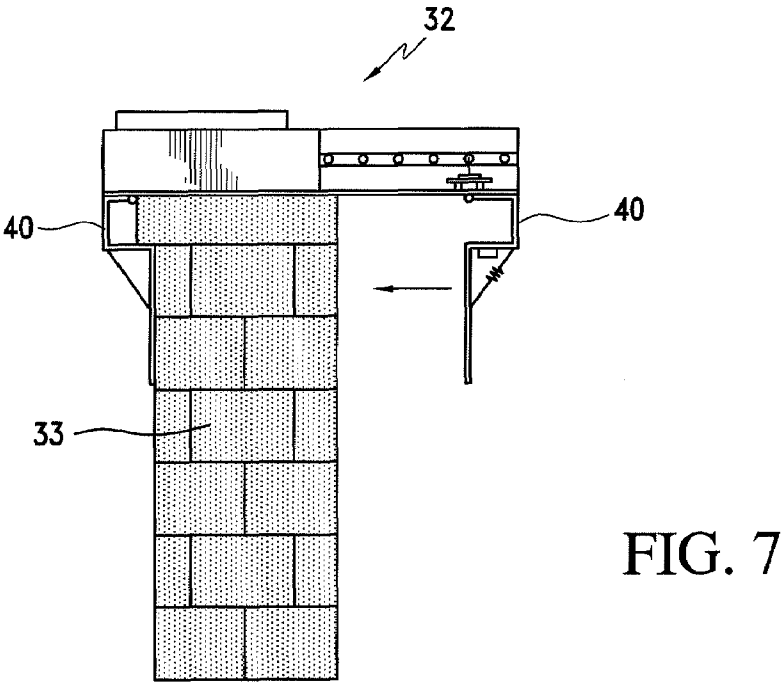
FIG. 7 is a schematic illustration of a mounting member and adjustment for installation on a relatively thin wall.

As shown in FIG. 1, a fire fighting tool in accordance with the present invention includes a longitudinally extending tubular nozzle 20 with a plurality of relatively small holes 22 extending along the longitudinal length and around the circumference of the nozzle 20. The nozzle 20 also includes a generally bullet shaped forward portion 24 which also includes a plurality of small holes 22 so that the surface of the nozzle 20 is essentially covered with the holes 22 so that water is sprayed out of the holes for extinguishing a fire. In a preferred embodiment of the invention the nozzle 20 has a length of about 80 cm and a diameter of about 5 cm (1.5 to 2.5 inches). The nozzle 20 is made of any suitable metal or alloy in the same manner as conventional fire fighting nozzles.

A tubular member or portion 26 is connected to or extends from the nozzle 20 and is free of the small holes in the nozzle. This tubular member extends across an opening in the wall of a structure so that the nozzle extends into the structure about 5 to 10 cm. The tubular member or portion 26 also includes a mounting member 21 and a handle 25 for carrying the nozzle 20.

The tubular member 26 is connected to a conventional fire hose 30 by means of a conventional coupling 28. As shown, the line 23 indicates the interior surface of a wall.

A mounting assembly 32 includes a base 34 that rests on an opening in a wall 33 as for example a window sill and an upper 36. The upper portion 36 includes an extension 37 having a plurality of openings for adjusting the width of the base 34 to accommodate walls of different thicknesses. The base 34 is also fitted with a suitable handle 38 for carrying the assembly 32 prior to installation and after removal when a fire has been extinguished. The assembly 32 also includes a pair of rotatable clamping members 40 for engaging an inner and an outer surface of the wall 33. The rotatable clamping members rotate about pivot points 41 and include a generally flat extension 42 that engages the bottom of the upper portion 36 to limit the rotation of the clamping members 40. The clamping members 40 also include a first perpendicular portion extending downwardly from an outer end of the first extension 42 and inwardly extending portion connected to downwardly extending portion 43. The two downwardly extending portions 43 are designed to engage the inner and outer surfaces of a wall. One of the clamping members includes a brace 48 that extends between the downwardly extending portion 43 and the inwardly extending portion to add rigidity to the assembly. The other clamping member 43 includes a turn buckle 45 and pivot 46 to apply a force against the downwardly extending portion 43. Also, one of the inwardly extending portions includes a handle 47 for positioning the clamping member 40 against the wall 33.

In addition, the assembly includes a locking device 50 adapted to receive the mounting member 21 thereunder and a bar 57 for holding the member 21 in place. The locking device 50 and bar 57 are fixed to the upper portion 36 for positioning the nozzle 20 and fastening the tubular member 26 in place. A locking/release handle 59 locks or releases the locking device in a conventional manner.

A top or plane view of the mounting assembly 32 is illustrated in FIG. 3. The assembly 32 includes the locking device 50 fixed to an upper portion 36 and handle 38 for carrying the assembly 32 from place to place. The mounting assembly 37 includes a lock base 51 and pin 52 to limit movement of the upper portion 36 on the base 34. A pair of mounting brackets 53 is also provided for carrying a transparent shield (not shown in FIG. 3). A pair of spring bias pins 55 is adapted to engage holes 37 for locking the assembly in a conventional manner. Any conventional means for locking the assembly in place and to properly space the clamping members 40 may be used.

FIG. 4 shows a transparent heat protector 60 of glass or plastic such as that used on a fireman's helmet to protect the fireman's face. As illustrated the heat protector 60 includes a metal boarder 62 and a pair of brackets 63 for mounting on or being attached to the mounting bracket 53 (see FIG. 3) on the base 34. A lower portion of the heat protector 60 also includes a U-shaped opening 64 which allows a fire hose to pass through the protector 60. One or two handles 65 may be attached to the sides of the protector 60.

FIG. 5 shows the heat shield 60 in an upright position with a hose 30 and the entire assembly fixed to an opening in a wall 33. Further details as shown in FIGS. 5 and 6 have been described with respect to the FIGS. 2, 3 and 5.

FIG. 6 illustrates the mounting assembly 32 in clamping member with the clamping member 40 fixed in a spaced apart position prior to installation on a wall. As illustrated, the clamping members 40 have been partially released from a position adjacent the assembly 32 toward a perpendicular position for engaging a wall (shown in F*ig*. 5).

Figure 8:
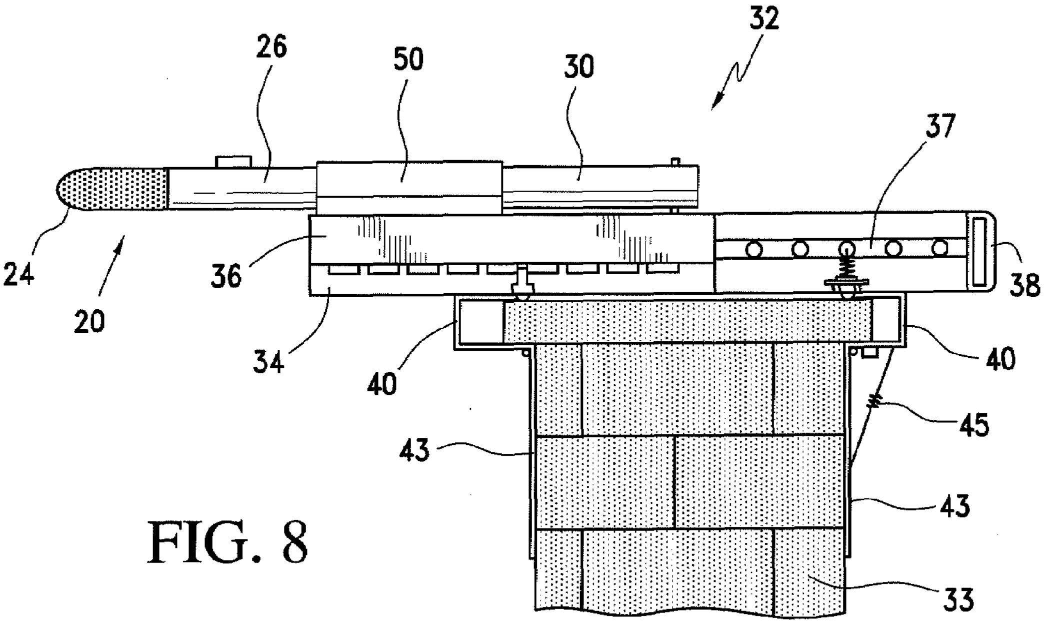
FIG. 8 is a schematic illustration of a mounting member as installed with a spray nozzle mounted thereon.

A schematic illustration in FIG. 7 illustrates the use of the mounting assembly on a relatively thin wall before adjustment of the spacing between the two clamping members 40. FIG. 8 shows the mounting assembly fixed to a wall 33.

While the invention has been described in connection with its preferred embodiments, it should be recognized that changes and modifications may be made therein without departing from the scope of the appended claims.

What is claimed is:

1. A fire fighting tool comprising:

an elongated cylindrical bullet-shaped nozzle having a forward portion with a plurality of openings around said nozzle and over said bullet-shaped portion including said forward portion thereof;

a tubular member connected to said nozzle and a coupling for connecting said tubular member to a source of pressurized water so that pressurized water flows through said tubular member and out of said nozzle;

a mounting member for positioning said nozzle within an interior of a structure inwardly of an interior wall of the structure, and said mounting member including a base and a pair or rotatable clamping members adjustably mounted on said mounting member and adapted to engage an inner surface and an outer surface of the wall of a structure through an opening in the wall with said base supported by the wall of the structure and said clamping members including means for preventing the rotation of said clamping members beyond 90° and being rotatable through about 90° between a position parallel with said base and perpendicular to said base;

a handle for carrying said tool fixed to said mounting member and a rotatable heat shield mounted on said base and rotatable from a position parallel to said base to an upright position for protecting a fireman from heat; and in which one of said clamping members includes a turn buckle for tightening said clamping member against an inner and an outer wall of any structure.

2. A fire fighting tool according to claim 1 which includes means for preventing the rotation of said clamping member beyond about 90° .

3. A fire fighting tool according to claim 2 which includes means for locking said tubular member onto said mounting member.

4. A fire fighting tool according to claim 1 in which said clamping member includes an outwardly projecting extension with two generally horizontal elements and a vertical element.

5. A fire fighting tool according to claim 4 in which one of said clamping members includes a downwardly extending portion pivotally mounted on one of said outwardly extending extensions and a brace.

6. A fire fighting tool according to claim 1 that includes means for positioning said tool in a generally center position on walls of different thicknesses.

7. A fire fighting tool according to claim 1 which is foldable into a relatively flat condition before and after use.

8. A fire fighting tool according to claim 1 in which said nozzle, tubular member and coupling are separable from said mounting member.

* * * * *